Patented Oct. 25, 1932

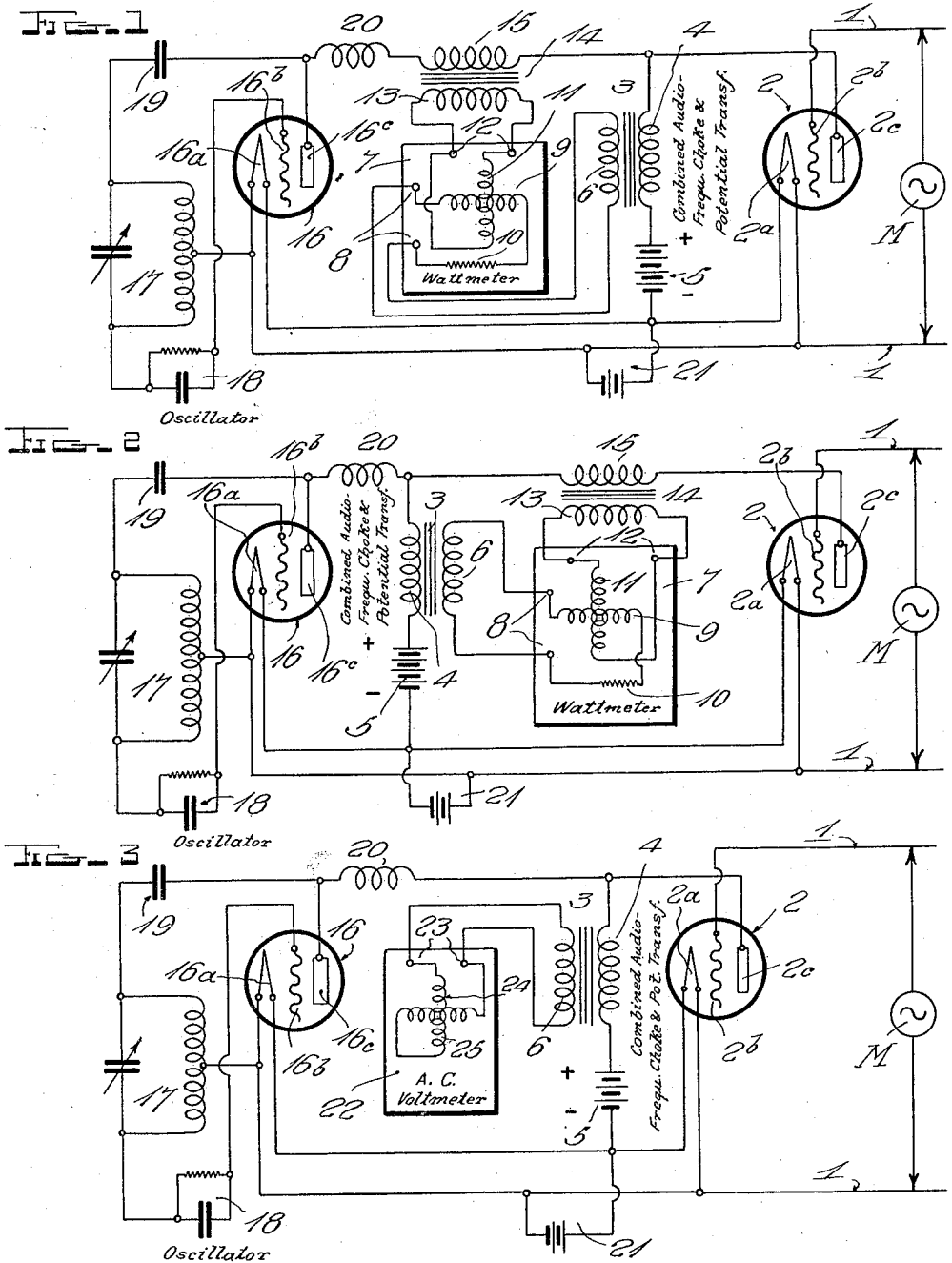

1,884,934

UNITED STATES PATENT OFFICE

JAMES D. WALLACE, OF WASHINGTON, DISTRICT OF COLUMBIA

APPARATUS FOR MEASURING THE PERCENTAGE OF MODULATION

Application filed March 12, 1931. Serial No. 522,078.

My invention relates broadly to measuring apparatus and more particularly to a circuit arrangement for a measuring for determining the percentage of modulation of a modulated radio frequency wave.

One of the objects of my invention is to provide a compact circuit arrangement for a measuring apparatus for determining the percentage of modulation of a modulated radio frequency wave in which the losses in the measuring apparatus are reduced to a minimum.

Another object of my invention is to provide a circuit arrangement for an apparatus for measuring the percentage of modulation of a modulated radio frequency wave in which a coupling unit is provided between the modulation circuit and an oscillator circuit which combines the characteristics of an audio frequency choke coil and a potential transformer for directly applying a portion of the energy transferred from the modulator circuit to the oscillator circuit to a measuring instrument for accurately determining thereby the percentage of modulation.

Still another object of my invention is to provide a construction of coupling circuit for an oscillator and a modulator system in a device for measuring the percentage of modulation in which a measuring instrument is coupled between the output of the modulator circuit and the oscillator circuit without the interposition of an audio frequency choke coil in the circuit for eliminating iron losses while enabling an accurate measurement of the percentage of modulation to be made.

Other and further objects of my invention reside in the circuit arrangement for an apparatus for measuring the percentage of modulation of a modulated radio frequency wave as set forth more fully in the specification hereinafter following by reference to the accompanying drawing, wherein:

Figure 1 diagrammatically illustrates a circuit arrangement embodying the principles of my invention; Fig. 2 illustrates a modified circuit arrangement operating in accordance with my invention; and Fig. 3 shows a circuit arrangement for measuring the potential applied to the oscillator circuit from the modulator circuit for determining therefrom the percentage of modulation of the modulated radio frequency wave existent in the oscillator.

A method and apparatus for measuring the percentage of modulation has been described in my copending application Serial No. 522,077, filed March 12, 1931, entitled "Method and apparatus for measurement of modulation".

The circuit arrangement of my present invention is an improvement upon the circuits of the aforesaid application in that the losses are substantially reduced in the circuit arrangement of the present application, thereby rendering the readings of the meter more accurate. The apparatus of my present invention employs the same combination of modulator circuit and oscillator circuit as set forth in the aforesaid application. There is an alternating component of voltage impressed across the plate and filament circuits of each of the tubes constituting the oscillator and modulator circuits. Heretofore the high potential circuit for the modulator has contained a series connected audio frequency choke coil, and in parallel with this choke has been placed the primary winding of a potential transformer and a by-pass condenser. The alternating component of voltage impressed directly upon this choke coil and potential transformer causes substantial iron losses in the core of the modulation choke and in the core of the potential transformer supplying the measuring instrument. Heretofore the primary circuit of the potential transformer has been completed through a by-pass condenser which has had to be of very large capacity value in order to sufficiently by-pass the low audio frequencies which are present in the transmission of speech. I have found a method for eliminating the audio frequency by-pass condenser and combining the potential transformer and the audio frequency choke into one unit, thereby decreasing the iron losses; also, since the by-pass condenser is eliminated, no dielectric losses are present in the measuring system.

The circuit arrangement for my invention has been set forth in various modifications in the drawing, in which reference character 1 designates the modulation circuit which includes electron tube 2 having cathode 2a, grid electrode 2b and plate electrode 2c. The input circuit for the modulator tube 2 connects to the source of modulated energy which I have designated at M. The output circuit of the modulator tube 2 connects through the combined audio frequency choke and potential transformer which I have represented at 3 having primary winding 4 and secondary winding 6. The primary winding 4 connects through the source of potential 5 with the output circuit of the modulator tube 2. The secondary winding 6 of the potential transformer 3 connects to the terminals 8 of the wattmeter 7, which terminals connect to a circuit through the potential coil 9 and impedance 10 of the wattmeter 7. The wattmeter includes a current coil 11 inductively related to the potential winding 9 and connected to terminals 12 on the wattmeter. Terminals 12 connect to the terminals of secondary winding 13 of the current transformer 14, the primary winding 15 of which is disposed in series between the output circuit of modulator tube 2 and a point in the oscillator circuit of tube 16 through the radio frequency choke coil 20. The oscillator circuit of electron tube 16 comprises an input and output system coupled through the resonant circuit 17, one end of which connects through grid leak and grid condenser 18 to the grid electrode 16b of oscillator tube 16. The opposite end of resonant circuit 17 connects through condenser 19 to the plate electrode 16c. A midpoint in the inductance forming part of resonant circuit 17 connects to the cathode 16a. The cathode 16a of the oscillator 16 and the cathode 2a of modulator tube 2 are heated from battery 21. It will be observed that the modulation choke and the potential transformer have been combined into a single instrument 3. Iron losses are therefore substantially reduced in the measuring system and the by-pass condenser normally required in the circuit with the primary winding of the potential transformer is eliminated.

The arrangement of the combined audio frequensy choke and frequency transformer with respect to the modulator and oscillator tubes may be modified as shown in Fig. 2 where the wattmeter has its current coil 11 energized through secondary winding 13 and primary winding 15 where the primary winding 15 is directly connected in the output circuit of the modulator tube 2. In lieu of the connection of the current coil between the output circuit of the modulator tube 2 and the oscillator circuit as shown in Fig. 1, I may employ the arrangement as shown in Fig. 2 where the potential coil 9 is energized from secondary winding 6 of the combined potential transformer and audio frequency choke coil indicated at 3 or the primary winding 4 connects across a portion of the oscillator circuit through the potential source 5 as shown. The wattmeter in Fig. 2 deflects proportional to the average value of the alternating component of power input in the modulator 2 to determine the percentage of modulation. In the arrangement shown in Fig. 1, the wattmeter deflects proportional to the average value of the alternating component of power input in the radio frequency generator 16 to measure the percentage of modulation.

It is also possible to determine the percentage of modulation by measuring the effective value of the alternating component of plate voltage applied to the radio frequency generator in the circuit arrangement shown in Fig. 3 while combining the audio frequency choke coil and the potential transformer and reducing iron losses. In this arrangement the combined audio frequency choke coil and potential transformer has been represented at 3 with the secondary winding 6 connected to terminals 23 of the alternating current voltmeter indicated at 22. The alternating current voltmeter includes inductively related windings 24 and 25 connected in series to the terminals 23 of the A. C. voltmeter 22. The alternating current voltmeter 22 deflects proportional to the square of the root mean square value of voltage impressed upon the radio frequency generator 16 to measure the percentage of modulation. The combined audio frequency choke coil and potential transformer actually operates as a transformer. However, to prevent the load on the secondary winding 6 of this transformer form lowering the impedance of the primary winding 4, the transformer must be designed with a relatively high leakage reactance.

It is necessary to maintain the primary impedance very high for proper operation in the constant current system of modulation. It is also necessary to make the resistance of the potential circuits of the meauring instruments as great as is practical, that they may require only a small quantity of power to operate them.

The measuring instruments shown in each of the figures may be used in either of two ways. The particular instrument may retain its own calibration, and by means of a reference curve drawn for the instrument in the particular circuit, the percentage of modulation may be determined by the amount of its deflection; or the calibration of the instrument may be removed and replaced by another reading directly in percentage of modulation. The instruments shown in any of the circuits will deflect proportional to the square of the percentage of modulation.

The apparatus for measuring percentage of modulation as set forth herein has been found to be highly efficient in its operation and simple in its construction, and while I have described my invention in certain of its preferred embodiments, I desire that it be understood that modifications may be made and that no limitations upon my invention are intended other than are imposed by the scope of the appended claims.

What I claim as new and desire to secure by Letters Patent of the United States is as follows:

1. Apparatus for measuring percentage of modulation comprising a modulation circuit, an oscillator circuit, connections between the output of said modulator circuit and said oscillator circuit, a circuit bridging said connections, said last mentioned circuit including a source of potential and the primary winding of a potential transformer, the secondary winding of said potential transformer being connected with a measuring instrument, said potential transformer having a high leakage reactance.

2. An apparatus for measuring percentage of modulation comprising an electron tube modulator including input and output circuits, an electron tube oscillator having coupled input and output circuits, connections between the output of said electron tube modulator and separated points in the circuits of said electron tube oscillator, a source of high potential, a potential transformer including primary and secondary windings, a series connected circuit including said source of potential and the primary winding of said potential transformer bridging said connections and a measuring instrument connected with the secondary winding of said potential transformer.

3. Apparatus for measuring percentage of modulation comprising an electron tube modulator and an electron tube oscillator, each including input and output circuits, connections between the circuits of said electron tube modulator and points in the circuits of said electron tube oscillator, a bridging circuit extending in series across said connections, said bridging circuit including a source of potential and the primary winding of a potential transformer, and a measuring instrument connected with the secondary winding of the potential transformer, said potential transformer having a relatively high reactance.

4. Apparatus for measuring percentage of modulation, comprising a modulator tube, an oscillator tube, circuits interconnecting each of said tubes, connections extending directly from the output of said modulator tube to points in the circuits of said oscillator tube and a bridging circuit between said connections including a source of potential and the primary winding of a potential transformer, a measuring instrument connected with the secondary winding of said potential transformer, said measuring instrument having a high leakage reactance.

5. An apparatus for measuring percentage of modulation comprising a modulator tube, an oscillator tube, connections extending between said tubes, a bridging circuit connected in shunt with the aforesaid circuits, a source of potential in said bridging circuit, a current transformer having primary and secondary windings with the primary winding thereof disposed in said connections, a potential transformer having the primary winding thereof connected in said bridging circuit, and inductively related instrument windings connected with the secondary windings of said current and potential transformers, said potential transformer constituting an audio frequency choke coil in the output of said modulator tube.

6. An apparatus for measuring percentage of modulation comprising a modulator tube, an oscillator tube, connections extending between said tubes, a bridging circuit connected in shunt with the aforesaid circuits, a source of potential in said bridging circuit, a current transformer having primary and secondary windings with the primary windings thereof disposed in said connections, a potential transformer having the primary winding thereof connected in said bridging circuit, and inductively related instrument windings connected with the secondary windings of said current and potential transformers, said potential transformer having a high leakage reactance in the output circuit of said modulator tube.

JAMES D. WALLACE.